United States Patent
Mays et al.

(10) Patent No.: US 12,180,561 B2
(45) Date of Patent: Dec. 31, 2024

(54) METHODS FOR EXTRACTING ELEMENTS FROM A SOLUTION

(71) Applicant: BASF Corporation, Florham Park, NJ (US)

(72) Inventors: William C. Mays, Southfield, MI (US); Jack Bender, Tucson, AZ (US); Benjamin Reichman, Southfield, MI (US); Diana Wong, Southfield, MI (US); Tinoush Dinn, Beachwood, OH (US); Martin L. Panchula, Beachwood, OH (US); Dieter G. Von Deak, Beachwood, OH (US)

(73) Assignee: BASF Corporation, Florham Park, NJ (US)

( * ) Notice: Subject to any disclaimer, the term of this patent is extended or adjusted under 35 U.S.C. 154(b) by 737 days.

(21) Appl. No.: 16/672,822

(22) Filed: Nov. 4, 2019

(65) Prior Publication Data
US 2020/0140972 A1 May 7, 2020

Related U.S. Application Data

(60) Provisional application No. 62/754,739, filed on Nov. 2, 2018.

(51) Int. Cl.
*C22B 3/30* (2006.01)
*C22B 3/00* (2006.01)
*C22B 26/12* (2006.01)

(52) U.S. Cl.
CPC ............ *C22B 3/30* (2021.05); *C22B 23/0461* (2013.01); *C22B 26/12* (2013.01)

(58) Field of Classification Search
CPC ........ C22B 3/30; C22B 23/0461; C22B 26/12
(Continued)

(56) References Cited

U.S. PATENT DOCUMENTS 8,444,744 B2 * 5/2013 Narisako ................. C22B 7/007
                                                              75/745
2011/0072936 A1    3/2011 Narisako et al.
(Continued)

FOREIGN PATENT DOCUMENTS

JP    2004307983 A    11/2004
JP    2014-162982 A    9/2014
(Continued)

OTHER PUBLICATIONS

Decision of Refusal from corresponding Chinese Patent Application No. 201980075740.2 dated May 26, 2023, along with a machine generated English translation.
(Continued)

*Primary Examiner* — Melissa S Swain
(74) *Attorney, Agent, or Firm* — DLA Piper LLP (US)

(57) ABSTRACT

Provided are processes for extracting nickel and lithium from a $Ni^{2+}/Li^+$ solution. The process for extracting nickel and lithium includes providing a $Ni^{2+}/Li^+$ solution comprising an amount of lithium and an amount of nickel, treating the $Ni^{2+}/Li^+$ solution with an alkaline agent to adjust the pH of the $Ni^{2+}/Li^+$ solution to between about 1.0 to about 10.0, and treating the $Ni^{2+}/Li^+$ solution with a nickel selective extractant, the nickel selective extractant suitable to extract nickel from the $Ni^{2+}/Li^+$ solution at said pH to thereby produce a $Li^+$ solution with less than 1000 parts per million $Ni^{2+}$. Once complete, the process provides for recoverable nickel and/or lithium that may be recycled into batteries or sold for other uses.

20 Claims, 4 Drawing Sheets

(58) Field of Classification Search
USPC ......................................................... 423/139
See application file for complete search history.

(56) References Cited

U.S. PATENT DOCUMENTS

| | | |
|---|---|---|
| 2013/0036603 A1 | 2/2013 | Christian et al. |
| 2014/0306162 A1 | 10/2014 | Poe et al. |
| 2015/0013499 A1 | 1/2015 | Asano et al. |
| 2020/0044295 A1 | 2/2020 | Arakawa et al. |

FOREIGN PATENT DOCUMENTS

| | | |
|---|---|---|
| JP | 2018-095968 A | 6/2018 |
| KR | 1020150002963 A | 1/2015 |
| WO | 2018/181816 A1 | 10/2018 |

OTHER PUBLICATIONS

Nguyen, Viet Tu, et al., "The Separation and Recovery of Nickel and Lithium from the Sulfate Leach Liquor of Spent Lithium Ion Batteries using PC/88A", *Korean Chem. Eng. Res.*, 53(2), 2015, pp. 137-144, http://dx.doi.org/10.9713/keer.2015.23.2.137, PISSN 0304-128X, EISSN 2233-9558.

Notice of Reasons for Refusal dated Dec. 12, 2023, of counterpart Japanese Patent Application No. 2021-524234, along with an English translation.

\* cited by examiner

METHODS FOR EXTRACTING ELEMENTS FROM A SOLUTION

CROSS REFERENCE TO RELATED APPLICATIONS

This application depends from and claims priority to U.S. Provisional Application No. 62/754,739 filed Nov. 2, 2018, the entire contents of which are incorporated herein by reference.

FIELD

The disclosure relates to methods of recovering elements from a solution. More specifically, the disclosure relates to methods of recovering lithium and nickel such as that optionally produced from a waste stream following delithiation of a lithium nickel oxide (e.g. $LiNiO_2$) material.

BACKGROUND

Lithium-ion batteries are increasingly used in essential applications such as powering electric vehicles, cellular telephones, and cameras. The increased application of such batteries in wide-ranging technological fields has enhanced the necessity of extracting valuable elements, such as nickel and lithium, produced as a waste stream from the production of these materials or from spent lithiated batteries in both a cost and time efficient manner. Materials that are extracted from these waste streams can be recycled back into the manufacturing process or sold and implemented in other related processes. As such, nickel and lithium recovery enables an economically-viable process for extracting lithiated nickel oxide active materials.

According to typical extraction methods currently used in the field, spent lithium-ion batteries are subjected to mechanical separating. The mechanical separating process includes unsealing, dismantling, and shredding the battery to be recycled. Such a process may be both time consuming environmentally unfriendly if the waste is not properly captured. Once shredded, valuable metals, such as nickel and lithium, may be leached from the battery by an acid-leaching process. Then, each of the components is separated so that precipitates may be formed from the individual acid-leached metals. The Ni and Li rich extractant produced as a waste of the delihitation of materials during production of cathodes for batteries may be directly subjected to recycling or discarded as waster.

Unfortunately, current extraction or recycling methods often utilize various oxidizers that generate a large amount of waste that must be processed, thereby requiring clean up time and costs. Moreover, these methods may not provide for effective separation of the extracted components, thereby making individual recovery of the materials impossible. Such deficiencies decrease the amount of material that may be recovered and also increase both the amount of waste produced and the costs associated with extraction of the battery materials.

Multi-stage co-extractions have been attempted so as to recover multiple materials, such as both nickel and lithium, at the same time. These methods, while able to produce individually extracted materials, require four co-extraction stages and six total steps in order to produce the individually extracted materials. As such, the current co-extraction processes are very time consuming as each step must be performed in isolation. Moreover, the amount of solvent needed during the co-extraction process is monetarily expensive as different solvents are needed during each step.

As such, new methods are needed to improve the efficiency and output of extracting materials, such as nickel and lithium, from a battery waste stream.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

Provided are processes for extracting lithium and nickel from a Nickel(II)/Lithium(I) ($Ni^{2+}/Li^+$) solution optionally supplied as the result of a delithiation of materials suitable for use in a battery. The $Ni^{2+}/Li^+$ solution may also contain some levels of Ni(III) and Ni(IV). It was found that certain loop processes allow for virtually complete recovery of nickel and lithium individually in both a time efficient and cost effective manner. The processes for extracting nickel and lithium from a $Ni^{2+}/Li^+$ solution optionally include providing a $Ni^{2+}/Li^+$ solution comprising an amount of lithium and an amount of nickel and treating the $Ni^{2+}/Li^+$ solution with an alkaline agent to adjust the pH of the $Ni^{2+}/Li^+$ solution to between about 1.0 and about 10.0. The process further includes treating the $Ni^{2+}/Li^+$ solution with a nickel selective extractant, the nickel selective extractant being suitable to extract nickel from the $Ni^{2+}/Li^+$ solution at the pH, thereby producing a $Li^+$ solution (nickel poor solution) optionally with less than 1000 parts per million $Ni^{2+}$.

In some aspects, the pH of the $Ni^{2+}/Li^+$ solution following combination with the alkaline agent is greater than 3.0. The alkaline agent is optionally selected from the group consisting of sodium hydroxide, potassium hydroxide, aqua ammonia, and a combination of at least two of the forgoing.

In some aspects, the nickel selective extractant is an oxime or a carboxylic acid. An oxime is optionally selected form the group consisting of 5-nonylsalicylaldoxime, 5-dodecylsalicylaldoxime, 5-nonyl-2-hydroxyacetophenone oxime, and a combination of at least two of the forgoing. A carboxylic acid is optionally, a tertiary carboxylic acid, optionally neodecanoic acid.

Optionally, the nickel selective extractant further comprises a hydrocarbon. The hydrocarbon is optionally selected from the group consisting of kerosene, paraffin, naphthene, and a combination of at least two of the forgoing. Optionally, the nickel selective extractant and hydrocarbon are present at 10:90 percent by volume to 30:70 percent by volume.

In some aspects, the pH of the $Ni^{2+}/Li^+$ solution when treating the $Ni^{2+}/Li^+$ solution with a nickel selective extractant is from 3.0 to 8.0. The step of treating the $Ni^{2+}/Li^+$ solution with a nickel selective extractant is optionally performed at a pH of about 7.0, optionally resulting from the combination with the alkaline agent.

The resulting $Li^+$ solution resulting from the nickel extraction is optionally less than 1000 parts per million Ni, optionally less than 100 parts per million Ni, optionally less than 10 parts per million Ni.

In some aspects, the process further includes treating the $Li^+$ solution with a carbonation agent to produce lithium salt. The carbonation agent is optionally selected from the group consisting of carbon dioxide ($CO_2$), ammonium, sodium carbonate, ammonium carbonate, bicarbonate, and a combination of at least two of the forgoing. Optionally, the lithium carbonate is filtered and washed.

In some aspects, the process further includes treating the $Li^+$ solution with a lithium selective extractant to produce a concentrated lithium salt solution. The lithium selective extractant is optionally 2-ethylhexyl phosphonic acid, mono-2-ethylhexyl ester, neodecanoic acid, or a combination of at least two of the foregoing. Optionally, the lithium selective extractant further comprises a hydrocarbon. The hydrocarbon is optionally kerosene, paraffin, naphthene, or a combination of at least two of the foregoing.

BRIEF DESCRIPTION OF THE DRAWINGS

The aspects of the disclosure set forth in the drawings are illustrative and exemplary in nature and not intended to limit the subject matter defined by the claims. The following detailed description of the illustrative aspects of the disclosure can be understood when read in conjunction with the following drawings, and in which:

DETAILED DESCRIPTION

Figure 1:
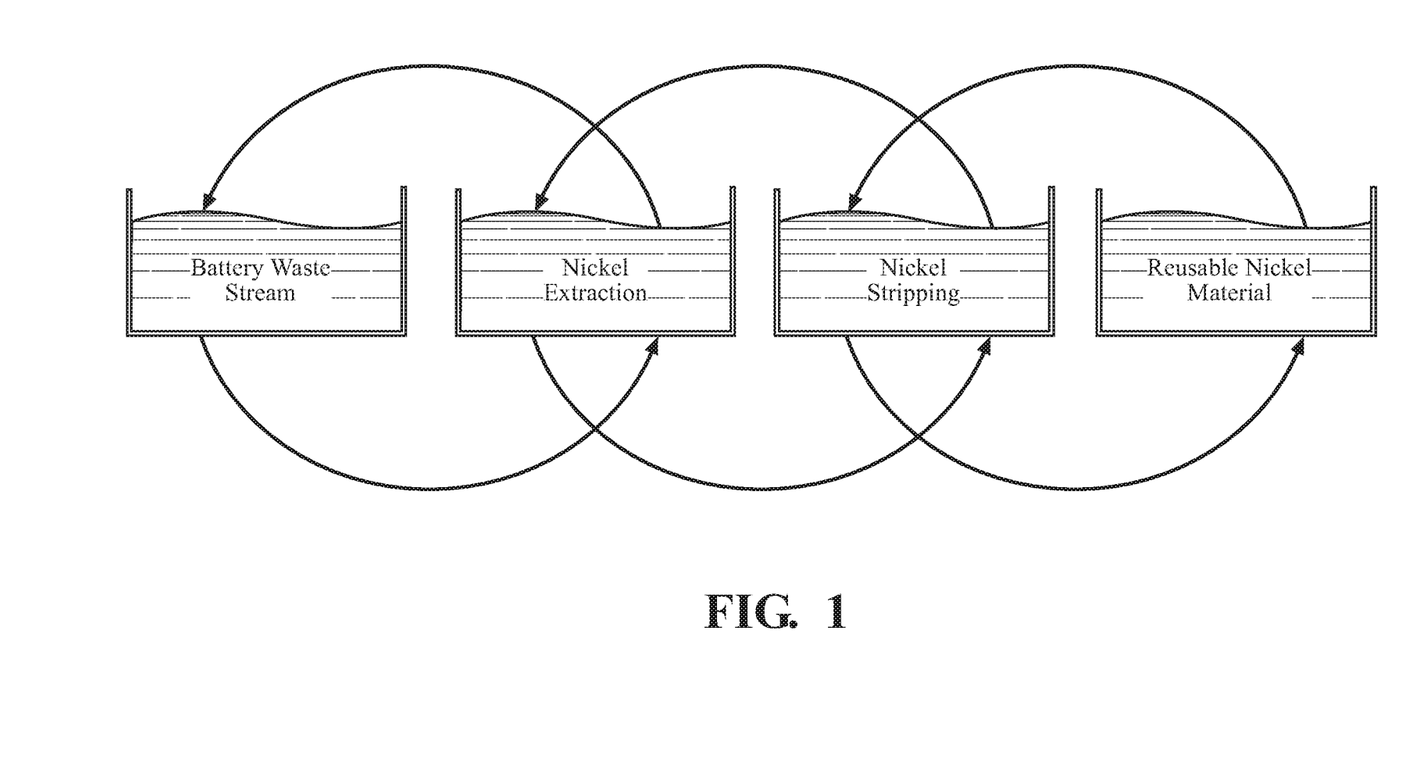
FIG. 1 is an illustrative schematic of a process according to some aspects illustrating an optional continuous extraction of materials from an exemplary waste or other material.

Provided herein are processes for separating nickel and optionally lithium from an input stream where the input stream is optionally waste following the delithiation of a $LiNiO_2$ material. The processes for the first time allows efficient and robust recovery of nickel and optionally lithium from these streams such that the resulting isolated nickel and lithium may be used for subsequent processes or for the formation of additional electrochemically active materials. The processes as provided herein according to some aspects of this disclosure utilize one or more continuous loop systems of counterflow organic and aqueous phases so as to be able to efficiently isolate and extract nickel, lithium or both from an input stream. A schematic of an overall process according to some aspects is illustrated in FIG. 1.

In some aspects, a process employs a continuous and optionally multi-step extraction whereby each extraction need not be performed in isolation from other steps so as to provide a much more robust overall extraction process that optionally operates in less time and producing less waste than prior processes. In general, a waste material is provided as a source of Ni and optionally Li for extraction or isolation by the processes as provided herein. The term "waste" as used herein is defined as a liquid or solid composition that includes both $Ni^{2+}$ and $Li^+$ with either or both at a concentration suitable for extraction. The term "waste" is not required to be that which is a used product of another prior process, but may be the result of an upstream process such as the leaching of Ni or Li from a prior processing step of a desired material. Optionally, waste as used herein is a waste stream from a continuous or discontinuous leaching of Ni and Li as produced during the delithiation of a lithium nickel oxide, optionally that used for the formation of a cathode in a primary or secondary electrochemical cell.

A waste material in the form of a $Ni^{2+}/Li^+$ solution is optionally subjected to a continuous multistage extraction process that may optionally include one or more extraction stages, one or more strip stages, and one or more wash stages, with any or all of the foregoing assembled into a continuous circuit. Optionally, a circuit design includes one or more wash stages. Optionally, the design includes 2 or more wash stages. The number of wash stages is as desired by a user and is not necessarily limited; however, in some aspects only a single wash stage is used.

A fluid circuit includes one or more extraction stages. The number of extraction stages is optionally from 1 to 10, or any value or range therebetween. Optionally, the number of extraction stages is from 2 to 10, 2 to 8, 2 to 6, 3 to 10, 3 to 8, 3 to 6. Optionally the number of extraction stages is 2, 3, 4, 5, 6, 7, or more. Optionally, the number of extraction stages is 6 or fewer, optionally 5 or fewer. The number of extraction stages in circuit allows for efficient extraction of Ni (or Li) in each stage and the production of a single Ni rich extractant that may then be subjected to further processing for obtaining the isolated Ni suitable for use in subsequent production processes. The resulting nickel poor solution ($Li^+$ solution) may then also be subjected subsequent isolation of the Li.

Figure 2A:
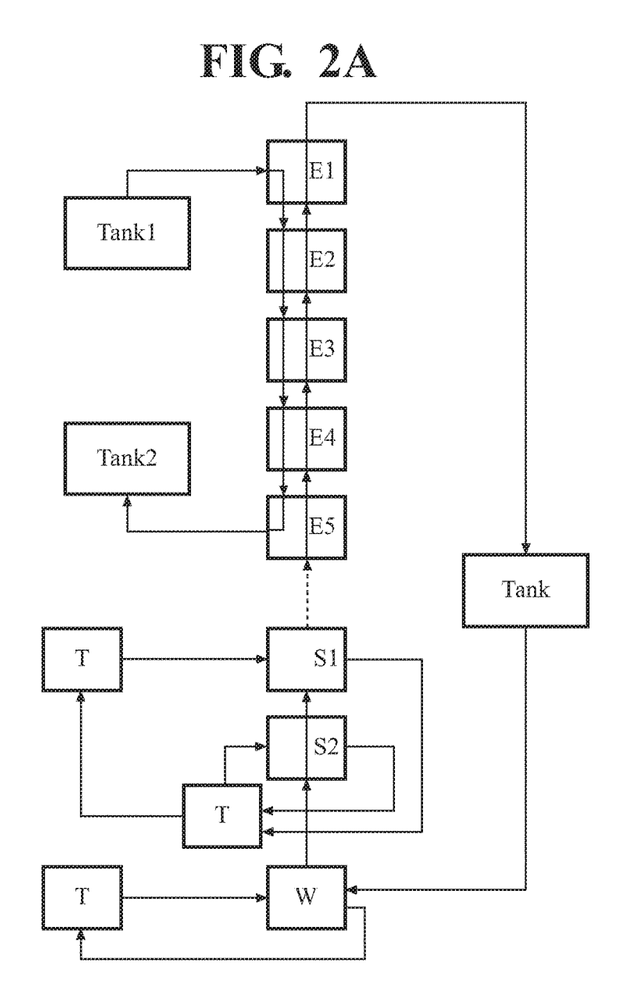
FIG. 2 illustrates a flow diagram of the processes as provided herein illustrating the various stages of extraction (E), washing (W), and stripping (S) with multiple extraction stages and multiple strip stages illustrating the flow of the organic stage, the input $Ni^{2+}/Li^{2+}$ solution, and the tanks that collect the output of the nickel extraction steps of the processes as provided herein illustrated in a process whereby the strip steps are in parallel (A), or series (B)
Figure 2B:
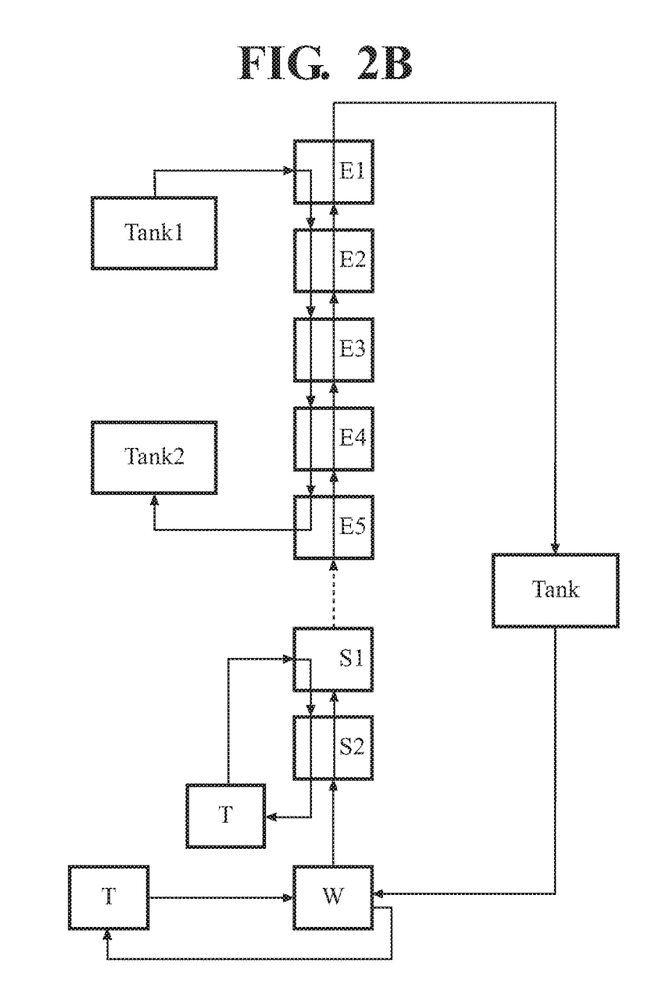

Each of the extraction stages may be housed in a mixer-settler that may then introduce an alkaline agent, a Ni selective extractant, or both. In an example where there are 5 extraction stages, 5 mixer settlers are fluidly connected such that product from one extraction stage can be passed to the subsequent mixer-settler and organic extraction solvent (including one or more nickel selective extractants) passed in the opposite direction in series to promote extraction of the Ni as the waste stream is moved from one extraction stage to the next. An exemplary generalized process is exemplified in FIGS. 2A and B with the difference that FIG. 2A illustrates strip stages (S1 and S2) employed in parallel and FIG. 2B depicts strip stages (S1 and S2) employed in series. As is illustrated in FIGS. 2A and B, a tank that includes a waste material that includes Ni and Li (Tank 1) and used as the feed through the system. The waste material is fed from extraction stage E1 in a first mixer settler and combined with nickel selective extractant moving the opposite direction in the series. As such, the waste material first contacts the nickel selective extractant in stage E1 and moves from E1 to E5, and the Ni selective extractant first enters the extraction stages at E5 moving from E5 to E1. After reaction in stage E1, the Ni depleted aqueous phase is moved to E2 and subsequently to E3, E4, and E5 so that Ni is continually depleted and concentrated in the organic phase that moves in the opposite direction. The Ni rich organic phase may then be optionally scrubbed in a wash stage (W) and transferred directly into the strip stage(s).

The Ni rich organic phase is optionally washed and then transferred to the strip stages S2 and S1, optionally in that order, to strip the Ni from the Ni selective extractant solution (organic) whereby each of the strip stages is housed in a separate mixer settler. Optionally, the number of strip stages is 1 or more, optionally 2 or more. The number of strip stages is optionally 4 or fewer, optionally 3 or fewer, optionally 2 or fewer. Similar to above for the extraction stages, the strip stages include a countercurrent flow of aqueous strip solution (e.g. acid) to strip the Ni from the Ni rich organic phase and produce a Ni salt.

Within each strip stage, the Ni rich organic phase is subjected to a stripping solution that includes an acid to exchange Ni with hydrogen and permit the purified and concentrated nickel to pass to the strip aqueous phase for production of a Ni salt that can either itself be used as an input material for subsequent manufacturing processes, or for subsequent further elemental isolation of the Ni (e.g. by an electrodeposition process or precipitation) for subsequent use. The Ni poor organic phase may then be optionally scrubbed in a wash stage and transferred back to a storage tank and/or transferred directly into the Ni extraction stages for subsequent extraction of Ni from the waste material.

The resulting nickel poor material ($Li^+$ solution) obtained as a result of the extraction stages is transferred to a holding tank (Tank 2) for subsequent recovery of Li, or transferred directly to a Li extraction process. Prior to being reintroduced into a subsequent Li extraction process, the $Li^+$ solution may be subjected to ion exchange. A Li extraction process is optionally either direct precipitation of the Li from the $Li^+$ solution (FIG. 3) or transferred to a Li extraction process substantially physically set up as above, but employing a Li selective extractant in the extraction stage(s) (FIG. 4). The result of the $Li^+$ extraction or precipitation are a Li salt that may also serve as a recycled material for the production of additional goods.

To provide greater detail, in some aspects of the disclosure, a process for extracting nickel and optionally lithium from a Nickel(II)/Lithium(I) ($Ni^{2+}/Li^+$) waste material includes providing a $Ni^{2+}/Li^+$ solution, optionally waste material, comprising an amount of lithium and an amount of nickel. The lithium present in the $Ni^{2+}/Li^+$ solution may be derived from any suitable lithium-containing and any suitable nickel-containing compound. Illustratively, a $Ni^{2+}/Li^+$ solution may be a waste stream as the result of delithiation of an electrochemically active material used in electrochemical cells and produced according to delithiation methods recognized in the art of illustratively, $LiNiO_2$ materials, NCM materials, or others. Optionally, the $Ni^{2+}/Li^+$ solution results from the delithiation of $LiNiO_2$ materials, or $LiNiMO_2$ where M is any of one of many metals such as Mn, Mg, Al, Co, and/or most any other transition metal. Other examples include $LiNiCoAlO_2$, $LiNiCoAlMO_2$ where M is optionally a transition metal, Mg, or other. A transition metal may be any transition metal suitable for use in an electrochemical cell. Illustrative examples of a transition metal include, but are not limited to Ni, Co, Mn, Al, Mg, Ti, Zr, Nb, Hf, V, Cr, Sn, Cu, Mo, W, Fe, Si, B, or other transition metals.

The production of electrochemically active materials or the other production of a $Ni^{2+}/Li^+$ solution may be by the combination of a lithium compound and a nickel compound. Optionally, a lithium compound is a lithium hydroxide, lithium oxide, lithium carbonate, lithium nitrate, lithium sulfate, lithium acetate, lithium peroxide, lithium hydrogen carbonate, or a lithium halide, or any combination thereof.

The amount of lithium present in the $Ni^{2+}/Li^+$ solution, according to some aspects, may range from about 5 g/L to about 250 g/L, optionally from about 20 g/L to about 150 g/L. In some aspects, the amount of lithium present in the $Ni^{2+}/Li^+$ solution is from about 10 g/L to about 200 g/L, about 15 g/L to about 175 g/L, about 20 g/L to about 150 g/L, about 25 g/L to about 125 g/L, about 30 g/L to about 100 g/L, about 40 g/L to about 75 g/L, or about 50 g/L to about 60 g/L.

In some aspects of the disclosure, the nickel present in the $Ni^{2+}/Li^+$ solution may be derived from any suitable nickel-containing compound such as hydroxide, oxide, oxyhydroxide, carbonate, or nitrate of Ni.

The amount of nickel present in the $Ni^{2+}/Li^+$ solution, according to some aspects, may range from about 5 g/L to about 400 g/L, optionally from about 20 g/L to about 200 g/L. In some aspects, the amount of lithium present in the $Ni^{2+}/Li^+$ solution is from about 10 g/L to about 300 g/L, about 15 g/L to about 250 g/L, about 20 g/L to about 200 g/L, about 25 g/L to about 150 g/L, about 30 g/L to about 100 g/L, about 40 g/L to about 75 g/L, or about 50 g/L to about 60 g/L.

A $LiNiO_2$ material may be delithiated substantially by processes as recognized in the art, illustratively those as described in U.S. Pat. No. 8,298,706 such as by subjecting the $LiNiO_2$ materials to aqueous 6 M $H_2SO_4$ at a desired delithiation temperature. Optionally, the $LiNiO_2$ may be delithiated in such a way so as to yield a sulfuric matrix with $Li^+$ and $Ni^{2+}$ which may be subsequently isolated using process described herein. Additionally, the removed supernatant from the wash may be used as a waste stream $Ni^{2+}/Li^+$ solution in the further aspects of the processes as provided herein.

In some aspects of the disclosure, the process for extracting nickel and/or lithium from a $Ni^{2+}/Li^+$ solution includes treating the $Ni^{2+}/Li^+$ solution in one or more extraction stages with an alkaline agent to adjust the pH of the $Ni^{2+}/Li^+$ solution to between about 1.0 to about 10.0. Suitable alkaline agents may include calcium oxide, sodium hydroxide, potassium hydroxide, aqua ammonia, or combinations thereof. Optionally, an alkaline agent excludes alkaline agents that will introduce into the system a cation that will confound recovery of one or more metals from the desired solution. Optionally, an alkaline agent excludes a sodium salt. Optionally, an alkaline agent excludes a potassium salt. Optionally, an alkaline agent excludes a calcium salt.

Optionally, the alkaline agent is provided at an amount and concentration to adjust the pH of the $Ni^{2+}/Li^+$ solution at one or more stages of extraction of $Ni^{2+}$ to between about 1.0 to about 10.0. Optionally, a pH of the $Ni^{2+}/Li^+$ solution following contact with the alkaline agent is about 1.5 to about 9.5, about 2.0 to about 9.0, about 2.5 to about 8.5, about 3.0 to about 8.0, about 3.5 to about 7.5, about 4.0 to about 7.0, about 4.5 to about 6.5, about 5.0 to about 6.0, or about 6.0 to about 7.5. Optionally, the alkaline agent is introduced at one or more extraction stages to adjust the pH of the solution to at or above about 3.0, about 3.5, about 4.0, about 4.5, about 5.0, about 5.5, about 6.0, about 6.5, about 7.0, about 7.5, or about 8.0. Optionally, the pH is adjusted at one or more extraction stages by contact with the alkaline agent so as to produce or maintain the pH of the extraction solution to about 6.0 to about 7.0.

In some aspects of the disclosure, the process for extracting nickel and lithium from a $Ni^{2+}/Li^+$ solution further includes treating the $Ni^{2+}/Li^+$ solution with a nickel selective extractant, the nickel selective extractant suitable to extract nickel from the $Ni^{2+}/Li^+$ solution at the desired pH to thereby produce a $Li^+$ solution with less Ni that the $Ni^{2+}/Li^+$ solution.

In some aspects, the nickel selective extractant is an oxime. Illustrative oximes include aldoximes and ketoximes. Such oximes are illustratively described by the following formula I:

(I)

wherein in formula I, R is an alkyl group having from 1 to 25 carbon atoms, an ethylenically unsaturated aliphatic group containing from 3 to 25 carbon atoms, or —$OR^1$ where $R^1$ is an alkyl group or ethylenically unsaturated aliphatic group as defined above, and c is 1, 2, 3, or 4; $R^2$ is H, an alkyl group containing 1 to 25 carbon atoms, an ethylenically unsaturated aliphatic group containing 3 to 25 carbon atoms, or where n is 0 or 1; and $R^3$ is an alkyl group having from 1 to 25 carbon atoms, an ethylenically unsaturated aliphatic group containing from 3 to 25 carbon atoms or —$OR^1$ wherein $R^1$ is an alkyl group or ethylenically unsaturated aliphatic group as defined above; optionally wherein the total number of carbon atoms in the R and $R^3$ groups is from 3 to 25. Such oximes are as described in U.S. Pat. Nos. 6,261,526 and 8,986,633.

Suitable illustrative specific oximes may include an aldoxime such as 5-nonylsalicylaldoxime, 5-dodecylsalicylaldoxime, or a ketoxime such as 5-nonyl-2-hydroxyacetophenone oxime. Optionally more than one oxime or oxime type are combined.

Optionally, a nickel selective extractant is a carboxylic acid. Optionally, a carboxylic acid nickel selective extractant is a tertiary carboxylic acid, optionally a branched tertiary carboxylic acid. Optionally, the carboxylic acid includes one or more alkyl radicals linked to the carboxylic acid group. An alkyl radical is optionally a C1-C10 alky radical, optionally C1 to C9. Optionally, three alkyl radicals are linked to a central carbon linked to the carboxylic acid group. Each of the three alkyl radicals are independently optionally C1 to C10 alkyl. Optionally, a first alkyl radical is a methyl. Optionally, a second alkyl is a C1 to C10 alkyl. Optionally, a third alkyl is a C1 to C5 alkyl. Each alkyl may be linear or branched. Optionally, a carboxylic acid nickel selective extractant is neodecanoic acid.

The nickel selective extractant may be added in one or more extraction stages to the $Ni^{2+}/Li^+$ solution from about 5 percent by volume to about 50 percent by volume, based on the total volume of the $Ni^{2+}/Li^+$ solution. Other suitable ranges of the nickel selective extractant may include from about 10 percent by volume to about 45 percent by volume, from about 15 percent by volume to about 40 percent by volume, or from about 20 percent by volume to about 30 percent by volume, based on the total volume of the $Ni^{2+}/Li^+$ solution.

In further aspects of the disclosure, the nickel selective extractant further includes a hydrocarbon as a diluent. Suitable hydrocarbons may include kerosene, paraffin, naphthene, or combinations thereof. The nickel selective extractant and hydrocarbon may be present together at varying ratios. Optionally, ratios of nickel selective extractant to hydrocarbon may range from about 1:99 by volume to about 99:1. Optionally the nickel selective extractant to hydrocarbon ratio is about 50:50 by volume, optionally 20:80 by volume. Optionally, the nickel selective extractant to hydrocarbon ratio is from about 2:98 percent by volume to about 45:55 by volume, about 3:97 by volume to about 40:60 by volume, about 5:95 by volume to about 40:60 by volume, about 7:93 by volume to about 35:65 by volume, or about 10:90 by volume to about 30:70 by volume where each of the nickel selective extractant and hydrocarbon are from a respective substantially isolated or saturated solution of the nickel selective extractant or hydrocarbon.

The processes as provided herein optionally include one or more extraction stages in series or in parallel. Optionally, the number of extraction stages where the nickel selective extractant, pH adjustment, or other contacts the $Ni^{2+}/Li^+$ solution is 1, 2, 3, 4, 5, 6, 7, or more stages. The multi-staging of the processes as provided herein provides rapid and robust extraction of nickel from the $Ni^{2+}/Li^+$ solution. The results of the one or more extraction stages is a nickel rich solution and a nickel poor solution that also includes lithium (e.g. $Li^+$ solution). The nickel poor solution (or result of the nickel extraction) is optionally less than or equal to 1000 ppm $Ni^{2+}$, 500 ppm $Ni^{2+}$, 100 ppm $Ni^{2+}$, 10 ppm $Ni^{2+}$, 9 ppm $Ni^{2+}$, 8 ppm $Ni^{2+}$, 7 ppm $Ni^{2+}$, 6 ppm $Ni^{2+}$, 5 ppm $Ni^{2+}$, 4 ppm $Ni^{2+}$, 3 ppm $Ni^{2+}$, 2 ppm $Ni^{2+}$, or 1 ppm $Ni^{2+}$. The nickel poor solution is optionally subsequently processed for the extraction of lithium from the nickel poor solution.

The nickel poor solution optionally has less than 10 percent the amount of Ni in the $Ni^{2+}/Li^+$ solution by weight. Optionally, the nickel poor solution optionally has less than 1 percent the amount of Ni in the $Ni^{2+}/Li^+$ solution, optionally less than 0.1 percent, optionally less than 0.01 percent, optionally less than 0.001 percent, optionally less than 0.0001 percent the amount of Ni in the $Ni^{2+}/Li^+$ solution by weight.

The nickel rich solution resulting from the extraction steps is optionally subjected to one or more stripping steps to obtain an isolated Ni product, optionally in the form of a Ni salt. In the one or more stripping steps, the pH of the nickel rich solution is lowered by the combination with an acid such as $H_2SO_4$ or other suitable acid. An acid is optionally added to reduce the pH from the pH of the extraction solution(s) to optionally at or less than about 3.0, optionally 2.0, or lower to thereby strip the Ni from the Ni rich solution and move it into an aqueous phase as a Ni salt or for subsequent isolation or use. The resulting solution(s) from the one or more strip stages is passed to a collection tank for direct use, cleaning or scrubbing, or may be subjected to further processes whereby the nickel may precipitate so as to be collectable and optionally usable for one or more downstream processes or for the formation of other materials.

The provided processes according to some aspects of this disclosure may further include extracting lithium from the nickel poor solution ($Li^+$ solution). Extracting Li is optionally performed in continuous form by the addition of one or more subsequent extraction stages continuously or discontinuously with the formation of the nickel poor solution formed as a result of the prior Ni extraction from the $Ni^{2+}/Li^+$ solution. The nickel poor solution is optionally subjected to direct precipitation of Li such as by direct precipitation such as with a carbonation agent or subjected to one or more Li extraction steps whereby the nickel poor solution is contacted with one or more lithium selective extractants, or a combination thereof. The number of Li extraction stages may be the same or different as the number of Ni extraction stages and may utilize a similar counterflow process of a Li selective extractant (organic) and Li$^+$ solution as described for Ni extraction.

Figure 3:
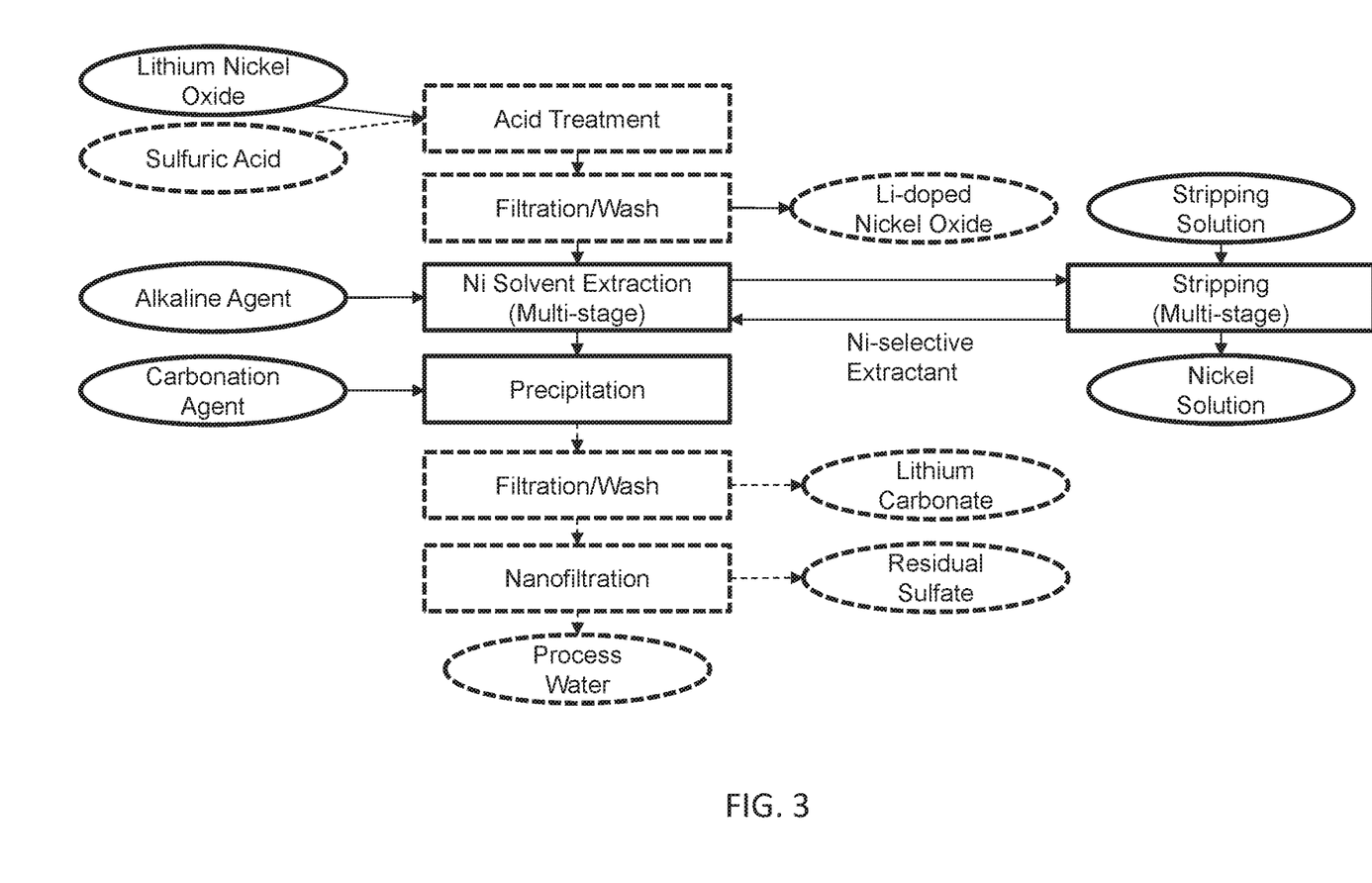
FIG. 3 is a schematic of an illustrative process as provided herein according to some aspects.
Figure 4:
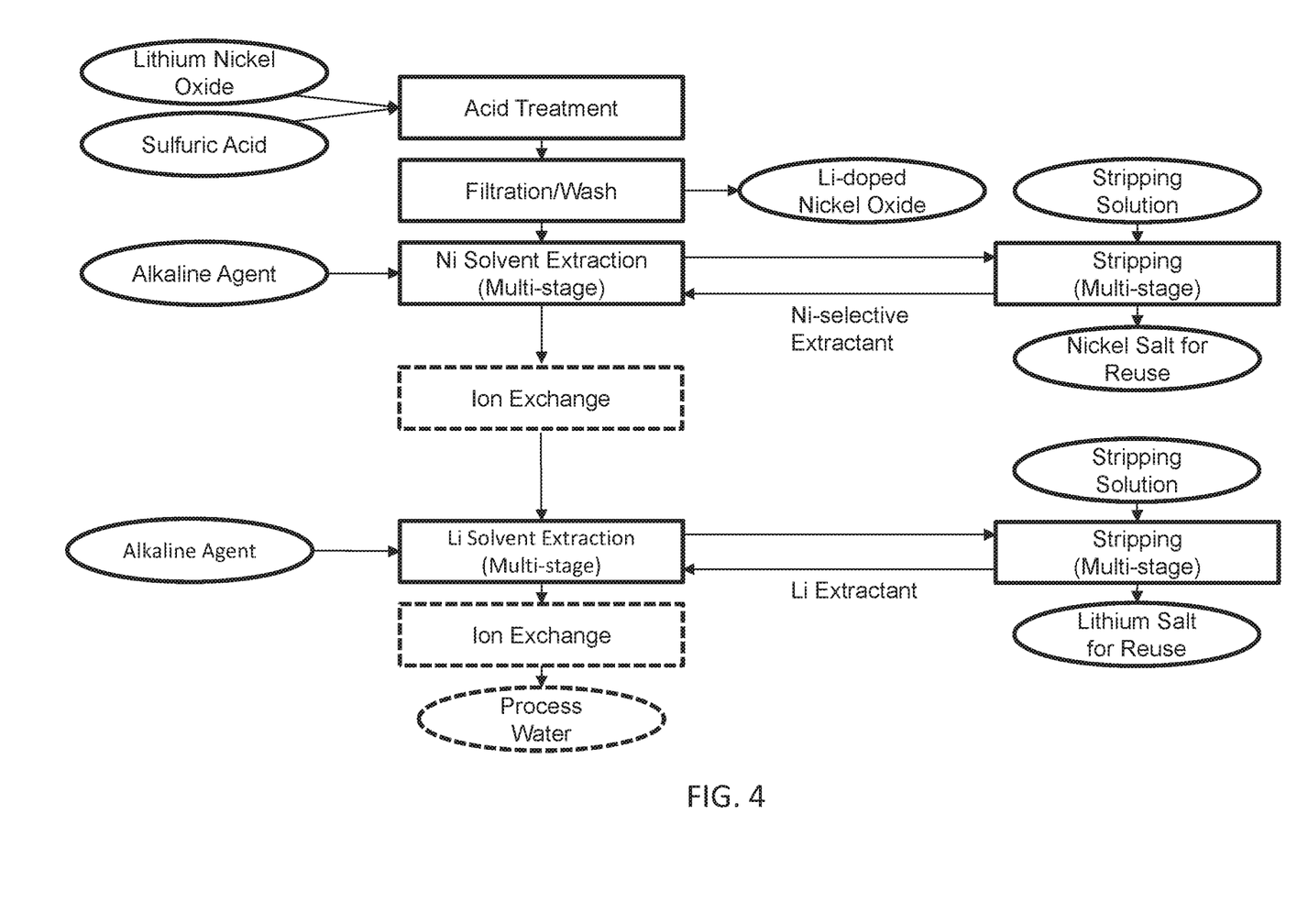
FIG. 4 is a schematic of an illustrative process as provided herein according to some aspects.

In some aspects, Li is directly precipitated from the Li$^+$ solution optionally as is illustrated in FIG. 3 by contact with a carbonation agent. Illustrative carbonation agents may include carbon dioxide plus ammonia, carbon dioxide, sodium carbonate, ammonium carbonate, or combinations thereof. The carbonation agent may be contacted with the Li$^+$ solution in a chamber and allowed to incubate at a desired time and for a desired temperature, optionally −5° C. to 120° C., to allow formation of a lithium carbonate salt. The lithium carbonate may be further washed or otherwise treated, or may be directly employed in the production of cathode electrochemically active materials for use in primary or secondary batteries.

Following precipitation, the resulting Li product may be subsequently filtered from the supernatant and washed so as to form a lithium carbonate that may be directly utilized for subsequent production of materials, optionally for the production of lithiated cathode electrochemically active materials.

The aqueous supernatant is optionally subjected to nanofiltration or other process to separate residual sulfates remaining from the prior Ni stripping stage and recover purified water that can then be subsequently used for subsequent stripping in the Ni isolation processes.

In some aspects, the Li$^+$ solution is subjected to an extraction process such as that illustrated in FIG. 4 whereby the Li$^+$ solution is passed through one or more extraction stages similar to the Ni extraction discussed above. The Li$^+$ solution will in each of the one or more extraction stages contact optionally an alkaline agent to adjust the pH to that desired for improved extraction, and lithium selective extractant suitable to extract lithium from the Li$^+$ solution and transfer it to the organic phase including the lithium selective extractant.

In some aspects of the disclosure, the process for includes contacting the Li$^+$ solution in one or more extraction stages with an alkaline agent to adjust the pH of the Li$^+$ solution to between about 1.0 to about 10.0. Suitable alkaline agents may include calcium oxide, sodium hydroxide, potassium hydroxide, aqua ammonia, or combinations thereof. Optionally, an alkaline agent excludes a sodium salt. Optionally, an alkaline agent excludes a potassium salt. Optionally, an alkaline agent excludes a calcium salt.

Optionally, the alkaline agent is provided at an amount and concentration to adjust the pH of the Li$^+$ solution at one or more stages of extraction of Li$^+$ to between about 1.0 to about 10.0. Optionally, a pH of the Li$^+$ solution following contact with the alkaline agent is about 1.5 to about 9.5, about 2.0 to about 9.0, about 2.5 to about 8.5, about 3.0 to about 8.0, about 3.5 to about 7.5, about 4.0 to about 7.0, about 4.5 to about 6.5, about 5.0 to about 6.0, or about 6.0 to about 7.5. Optionally, the alkaline agent is introduced at one or more extraction stages to adjust the pH of the solution to at or above about 3.0, about 3.5, about 4.0, about 4.5, about 5.0, about 5.5, about 6.0, about 6.5, about 7.0, about 7.5, or about 8.0. Optionally, the pH is adjusted at one or more extraction stages by contact with the alkaline agent so as to produce or maintain the pH of the extraction solution to about 6.0 to about 7.0.

Subsequent to or simultaneous with the contact with the alkaline agent, the Li$^+$ solution is contacted with one or more lithium selective extractants. Optionally, a lithium selective extractant is added to 10% to 40% v/v, optionally 10% to 30% v/v, optionally 15% to 25% v/v. Optionally, the lithium selective extractant is added at a volume percent of 10%, 15%, 20%, 25%, or 30%. The solution of lithium selective extractant is optionally added to the forgoing volume percent from a substantially purified or saturated solution of the lithium selective extractant.

Illustrative examples of such lithium selective extractants are 2-hydroxy-5-nonylacetophenone oxime (LIX 844), LIX 54-100, LIX 55 (BASF), CYANEX 936 (SOLVAY) and CYANEX 923 (SOLVAY) that is a mixture of four trialkylphosphine oxides $R_3P(O)$, $R_2R'P(O)$, $RR'_2(O)$, and $R'_3P(O)$ where R is a linear C8-alkyl radical and R' is a linear C6-alkyl radical, or any blend of these reagents. In some aspects, the lithium selective extractant is an acid. Suitable acids may include a 2-ethylhexyl phosphonic acid mono-2-ethylhexyl ester, neodecanoic acid, or combinations thereof.

In some aspects, the lithium selective extractant further comprises a hydrocarbon as a diluent. Suitable hydrocarbons may include kerosene, paraffin, naphthene, or combinations thereof. The lithium selective extractant and hydrocarbon may be present together at varying ratios. Optionally, ratios of lithium selective extractant to hydrocarbon may range from about 1:99 by volume to about 99:1. Optionally the lithium selective extractant to hydrocarbon ratio is about 50:50 by volume, optionally 20:80 by volume. Optionally, the lithium selective extractant to hydrocarbon ratio is from about 2:98 percent by volume to about 45:55 by volume, about 3:97 by volume to about 40:60 by volume, about 5:95 by volume to about 40:60 by volume, about 7:93 by volume to about 35:65 by volume, or about 10:90 by volume to about 30:70 by volume where each of the lithium selective extractant and hydrocarbon are from a respective substantially isolated or saturated solution of the lithium selective extractant or hydrocarbon.

The processes including Li extraction as provided herein optionally include one or more extraction stages in series or in parallel. Optionally, the number of extraction stages where the lithium selective extractant, pH adjustment, or other contacts the Li$^+$ solution is 1, 2, 3, 4, 5, 6, 7, or more stages. The results of the one or more extraction stages is a Li rich solution and a Li poor solution. The Li poor solution (or result of the lithium extraction) is optionally less than or equal to 1000 ppm Li$^+$ 500 ppm Li$^+$ 100 ppm Li$^+$ 10 ppm Li$^+$ 9 ppm Li$^+$ 8 ppm Li$^+$ 7 ppm Li$^+$ 6 ppm Li$^+$ 5 ppm Li$^+$ 4 ppm Li$^+$ 3 ppm Li$^+$ 2 ppm Li$^+$ or 1 ppm Li$^+$.

The lithium poor solution optionally has less than 10 percent the amount of Li in the Li$^+$ solution by weight. Optionally, the lithium poor solution optionally has less than 1 percent the amount of Li in the Li$^+$ solution, optionally less than 0.1 percent, optionally less than 0.01 percent, optionally less than 0.001 percent, optionally less than 0.0001 percent the amount of Li in the Li$^+$ solution by weight.

The lithium rich solution resulting from the extraction steps is optionally subjected to one or more stripping steps to obtain an isolated Li product, optionally in the form of a Li salt. In the one or more stripping steps, the pH of the lithium rich solution is lowered by the combination with an acid such as $H_2SO_4$, HCl, or other suitable acid. An acid is optionally added to reduce the pH from the pH of the extraction solution(s) to optionally at or less than about 3.0, optionally 2.0, or lower to thereby strip the Li from the Li rich solution and move it into an aqueous phase as a Li salt or for subsequent isolation or use. The resulting solution(s) from the one or more strip stages is passed to a collection tank for direct use, cleaning or scrubbing, or may be subjected to further processes whereby the lithium may precipitate so as to be collectable and optionally usable for one or more downstream processes or for the formation of other materials.

The extracted nickel, lithium, or both are optionally washed, the liquid materials filtered, and the products suitable for use in one or more downstream processes.

The processes and lithium and/or nickel produced thereby achieve an extraction method that creates excellent recovery amounts resulting in materials that me be recycled or sold for use in lithium-ion batteries.

Various aspects of the present disclosure are illustrated by the following non-limiting examples. The examples are for illustrative purposes and are not a limitation on any practice of the present disclosure. It will be understood that variations and modifications can be made without departing from the spirit and scope of the disclosure. Reagents and materials illustrated herein are obtained from commercial sources unless otherwise indicated.

EXPERIMENTAL

An extraction circuit was assembled substantially as illustrated in FIG. 2 so as to be a continuous loop system allowing for consistent extraction of Ni or Li from an initial solution. In this example, the extraction of nickel from an aqueous pregnant leach solution (PLS) formed of Ni: 31.03 g/L, Li: 8.06 g/L, pH: 1.94 is exemplified.

PLS was made in the lab from $NiSO_4 \cdot 6H_2O$, $Li_2SO_4$, and $H_2SO_4$, and was meant to mimic a standard process solution following delithiation of a $LiNiO_2$ electrochemically active material. PLS was diluted with water 1:1 v/v prior to entering the primary mix box of the E1 stage (FIG. 2). The organic phase used in Ni extraction consisted of a 29.16 v/v % solution of LIX 84-IC (a water insoluble 2-hydroxy-5-nonylacetophenone oxime; BASF) in Orform SX-12 (CAS 64742-47-8; Chevron Phillips). The strip solution was 120 g/L $H_2SO_4$. The wash stage used deionized water.

The circuit design, from top to bottom (FIG. 2), was: five extraction stages (E1-E5); one wash stage (W1), and two strip stages (S1, S2). The Ni rich organic phase was subjected to a wash stage in series and upstream from the strip stages. The extraction stages were designed to flow in series. The design was such that organic and aqueous solutions would flow counter-current to each other. Two strip stage configurations were tested, parallel (FIG. 2A) and series (FIG. 2B).

The organic phase flowed in series across the circuit from bottom to top as depicted, from a loaded surge tank to through the extraction stages, through a wash stage, through the strip stages, and back into the loaded surge tank.

PLS was fed into the extraction stage furthest to the top E1 as depicted in FIGS. 2A and B. Within each stage, PLS traveled through primary and secondary mix-boxes and into a settler. The primary mix box introduced the alkaline agent, and the secondary mix box introduced the Ni selective extractant in the organic phase. The overall PLS flow, however, was from top to bottom through the circuit as depicted in FIGS. 2A and 2B.

When the strip stages were configured in series the aqueous phase flowed top to bottom across the circuit, counter-current to the organic phase.

pH dosing pumps were used within each extraction stage to maintain a pH of 7 within each primary mix-box. Each dosing unit pumped a 29% ammonium hydroxide solution that had been diluted 9:1 (reagent:water). Base was added to the primary mix-box of the E1 and E2 stages, and to a pre-stage mix-box in the E3-E5 stages, where it was allowed to mix with the PLS prior to contacting organic in the primary mix-box.

Aqueous and organic samples were taken from each settler and analyzed for the amount of Ni and Li. The results of the Ni extraction are presented in Table 1.

TABLE 1

Amounts of Ni and Li in the aqueous phase.

| | Day 1 Aqueous | | Day 2 Aqueous | |
|---|---|---|---|---|
| | Ni (g/L) 3 pm | Li (g/L) 3 pm | Ni (g/L) 4 pm | Li (g/L) 4 pm |
| E1 | 12.744 | 3.513 | 5.355 | 3.7 |
| E2 | 1.9946 | 3.467 | 0.0757 | 3.624 |
| E3 | 0.0068 | 3.562 | ND | ND |
| E4 | 0 | 3.62 | 0 | ND |
| E5 | 0 | 3.644 | 0 | 3.748 |
| S1 | 42.668 | 0.03 | 50.31 | 0.02 |
| S2 | 17.412 | 0 | 25.03 | 0 |
| Wash | 0.0464 | 0.0033 | ND | 0.07 |

As illustrated in Table 1, the amount of Ni in the aqueous phase is rapidly depleted as the aqueous moves through extraction stages E1 to E5 with virtually no Ni remaining by E3 (below limit of detection). Following the strip stages, the Ni is effectively isolated and useable for subsequent processing while the organic phase is renewed and able to be washed and used for subsequent Ni extraction if desired.

Various modifications of the present disclosure, in addition to those shown and described herein, will be apparent to those skilled in the art of the above description. Such modifications are also intended to fall within the scope of the appended claims.

It is appreciated that all reagents are obtainable by sources known in the art unless otherwise specified.

This description of particular aspect(s) is merely exemplary in nature and is in no way intended to limit the scope of the disclosure, its application, or uses, which may, of course, vary. The materials and processes are described with relation to the non-limiting definitions and terminology included herein. These definitions and terminology are not designed to function as a limitation on the scope or practice of the disclosure, but are presented for illustrative and descriptive purposes only. While the processes or compositions are described as an order of individual steps or using specific materials, it is appreciated that steps or materials may be interchangeable such that the description of the disclosure may include multiple parts or steps arranged in many ways as is readily appreciated by one of skill in the art.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first 'element'", "component," "region," "layer," or "section" discussed below could be termed a second (or other) element, component, region, layer, or section without departing from the teachings herein.

The terminology used herein is for the purpose of describing particular aspects of the disclosure only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Patents, publications, and applications mentioned in the specification are indicative of the levels of those skilled in the art to which the disclosure pertains. These patents, publications, and applications are incorporated herein by reference to the same extent as if each individual patent, publication, or application was specifically and individually incorporated herein by reference.

The foregoing description is illustrative of particular aspects of the disclosure, but is not meant to be a limitation upon the practice thereof.

The invention claimed is:

1. A process for extracting nickel from a Nickel(II)/Lithium(I) ($Ni^{2+}/Li^+$) solution, the process comprising:
   (A) providing a $Ni^{2+}/Li^+$ solution comprising an amount of lithium and an amount of nickel;
   (B) treating the $Ni^{2+}/Li^+$ with an alkaline agent to adjust the pH of the $Ni^{2+}/Li^+$ solution to between about 1.0 to about 10.0, optionally about 5.0 to about 10.0, optionally about 6.0 to about 10.0; and
   (C) treating the $Ni^{2+}/Li^+$ solution with a nickel selective extractant via a counterflow of organic and aqueous phases in two or more stages, the nickel selective extractant suitable to extract nickel from the $Ni^{2+}/Li^+$ solution while the lithium stays in the $Ni^{2+}/Li^+$ solution at said pH to thereby produce a $Li^+$ solution with less $Ni^{2+}$ than said $Ni^{2+}/Li^+$ solution.

2. The process of claim 1, further comprising isolating a lithium salt, optionally by treating the $Li^+$ solution with a carbonation agent to produce lithium salt.

3. The process of claim 2, wherein the carbonation agent is selected from the group consisting of carbon dioxide ($CO_2$), sodium carbonate, ammonium carbonate, bicarbonate, and a combination of at least two of the foregoing.

4. The process of claim 2, wherein the lithium salt is filtered and washed.

5. The process of claim 1, wherein the $Li^+$ solution comprises less than 1000 parts per million $Ni^{2+}$, optionally less than 100 parts per million optionally less than 10 parts per million $Ni^{2+}$.

6. The process of claim 1, wherein the alkaline agent is selected from the group consisting of sodium hydroxide, potassium hydroxide, ammonium hydroxide, and a combination of at least two of the foregoing.

7. The process of claim 1, wherein the nickel selective extractant is an oxime.

8. The process of claim 7, wherein the oxime is selected from the group consisting of 5-nonsalicylaldoxime, 5-dodecylsalicylaldoxime, 5-nonyl-2-hydroxyacetophenone oxime, and a combination of at least two of the foregoing.

9. The process of claim 1, wherein the nickel selective extractant further comprises a hydrocarbon.

10. The process of claim 9, wherein they hydrocarbon is selected from the group consisting of kerosene, paraffin, naphthene, and a combination of at least two of the foregoing.

11. The process of claim 9, wherein the nickel selective extractant and hydrocarbon are present at 10:90 percent by volume to 30:70 percent by volume.

12. The process of claim 1, wherein step (C) is performed at a pH of about 7.0.

13. The process of claim 1, wherein:
   the pH of the $Ni^{2+}/Li^+$ solution of step (B) is from 6.0 to 8.0,
   the $Li^{2+}$ solution of step (C) comprises less than 1000 parts per million $Ni^{2+}$; and the process further comprising
   (D) treating the $Li^+$ solution with a lithium selective extractant to produce a concentrated lithium salt solution.

14. The process of claim 13, wherein the lithium selective extractant is 2-ethylhexyl phosphonic acid mono-2-ethylhexyl ester, neodecanoic acid, or a combination of at least two of the foregoing.

15. The process of claim 13, wherein the lithium selective extractant further comprises a hydrocarbon.

16. The process of claim 15, wherein the hydrocarbon is selected from the group consisting of kerosene, paraffin, naphthene, or a combination of at least two of the foregoing.

17. The process of claim 13, wherein the alkaline agent comprises calcium oxide, sodium hydroxide potassium hydroxide, ammonia, or a combination of at least two of the foregoing.

18. The process of claim 13, wherein the nickel selective extractant is an oxime.

19. The process of claim 18, wherein the oxime is selected from the group consisting of 5-nonylsalicylaldoxime, 5-dodecylsalicylaldoxime, 5-nonyl-2-hydroxyacetophenone oxime, and a combination of at least two of the foregoing.

20. The process of claim 1, wherein prior to step (A) the process further comprises delithiating a $LiNiO_2$ compound.

* * * * *